(12) United States Patent
André et al.

(10) Patent No.: US 12,136,791 B2
(45) Date of Patent: Nov. 5, 2024

(54) WELDABLE CHIP CARD CONNECTOR AND CORRESPONDING MOUNTING METHOD

(71) Applicant: BANKS AND ACQUIRERS INTERNATIONAL HOLDING, Suresnes (FR)

(72) Inventors: Jérôme André, Montoison (FR); Yann Granddidier, Lemps (FR)

(73) Assignee: BANKS AND ACQUIRERS INTERNATIONAL HOLDING, Paris (FR)

( * ) Notice: Subject to any disclaimer, the term of this patent is extended or adjusted under 35 U.S.C. 154(b) by 2 days.

(21) Appl. No.: 18/034,186

(22) PCT Filed: Oct. 29, 2021

(86) PCT No.: PCT/EP2021/080213
§ 371 (c)(1),
(2) Date: Apr. 27, 2023

(87) PCT Pub. No.: WO2022/090516
PCT Pub. Date: May 5, 2022

(65) Prior Publication Data
US 2023/0411918 A1 Dec. 21, 2023

(30) Foreign Application Priority Data
Oct. 30, 2020 (FR) ..................... 20/11174

(51) Int. Cl.
*G06K 7/10* (2006.01)
*H01R 43/20* (2006.01)
(52) U.S. Cl.
CPC ....... *H01R 43/205* (2013.01); *G06K 7/10297* (2013.01)

(58) Field of Classification Search
CPC .................. H01R 43/205; G06K 7/10297
(Continued)

(56) References Cited

U.S. PATENT DOCUMENTS

| 6,053,748 A | 4/2000 | Bricaud et al. |
| 2012/0043383 A1* | 2/2012 | Liu ..................... G06K 7/0008 235/441 |

FOREIGN PATENT DOCUMENTS

| EP | 1059600 A2 | 12/2000 |
| FR | 3085514 A1 | 3/2020 |
| WO | 97/39418 A1 | 10/1997 |

OTHER PUBLICATIONS

Jan. 19, 2022 International Search Report issued in International Patent Application No. PCT/EP2021/080213.

* cited by examiner

*Primary Examiner* — Daniel A Hess
(74) *Attorney, Agent, or Firm* — Oliff PLC

(57) ABSTRACT

A memory card reader body includes an upper face consisting of a cover and a lower face consisting of a base in which there is made a through-orifice for receiving a memory card connector, wherein: —said base is a metal component including first means of assembly with said cover, which means are each positioned on at least two opposing sides of said base, —said cover is a metal component including second means of assembly with said base, which means are each positioned on at least two opposing sides of said cover, wherein said first means of assembly are intended to plug together with the second means of assembly to form two lateral walls of said memory card reader body, said lateral walls having the overall shape of a rectangular parallelepiped and extending substantially perpendicular to the lower face of said memory card reader.

6 Claims, 8 Drawing Sheets

(58) Field of Classification Search
USPC .......................................................... 235/494
See application file for complete search history.

WELDABLE CHIP CARD CONNECTOR AND CORRESPONDING MOUNTING METHOD

1. FIELD OF THE INVENTION

The invention is in the field of memory card readers. The invention more particularly relates to a memory card reader intended to be mounted in a memory card reading terminal, such as a payment terminal or an identification terminal for example. More generally, the invention relates to any type of terminal which may comprise a memory card reader.

2. PRIOR ART

The memory card reading terminals comprise, in addition to a memory card reader, a certain number of components such as a keyboard, a screen, one or more processors, memory, an electrical power source. For several years, memory card reading terminals have seen their functions multiply. This is particularly true for payment terminals. In addition to the payment function, these terminals embed network communication functions, contactless memory card detection functions («contactless» cards), coupon management functions (for example loyalty coupons), etc.

In addition to the multiplication of these auxiliary functions, the memory card reading terminals must also be resistant to the various attacks or attempts at fraud to which they are frequently the object. In order to obtain uniformity in the resistance of terminals to attacks, international standards have been enacted. In the field of payment, for example, the PCI PED (Payment Card Industry—Pin Entry Device) standard lays down requirements for intrusion and detection of attempted attacks on terminals. This is not the only standard in force.

However, because of these standards, the terminals which were previously poorly protected are gradually being replaced by increasingly secure terminals. Among the terminal security points, manufacturers in the sector pay particular attention to the protection of the memory card reader. The memory card reader, in fact, remains a weak link in the memory card reading terminal. This is due to the fact that the memory card reader comprises a slot for inserting the memory card, this slot making the interior of the memory card reading terminal accessible from the outside. More specifically, attackers seek to obtain access to the memory card connector. The memory card connector is the part of the memory card reader that comes into contact with the chip or microprocessor embedded in the memory card. When an attacker manages to gain access to this memory card connector without anyone noticing, it is then possible for him to intercept and read the data which is exchanged between the card chip or microprocessor and the processor of the memory card reading terminal. Among the intercepted data, mention may be made in particular of the secret code entered by the customer when requesting the secret code, which can be conveyed without encryption on certain non-(or badly) secure chip cards.

This explains why many efforts have been made to secure the memory card reader. Thus, for example, memory card readers have been provided with mesh protection. This protection allows preventing an insertion by drilling into the terminal. When an object attempts to enter the protective enclosure, a short circuit is produced, causing the terminal to be put out of service. Moreover, modifications to protect memory card connectors against electrostatic discharge and against wear have also been proposed. This involves, for example, placing, at the entrance to the memory card reader, metal parts ensuring the mechanical guidance (prevention against wear) and/or the discharge of the card prior to its insertion into the memory card reader. Commonly, these metal parts are in the form of metal guide rods a few millimeters high. Another example is to add metal parts that come in the form of a discharge comb from the card.

All of these modifications have resulted in significant manufacturing complexity. Besides, the manufacturing cost has also increased. Indeed, multiple assembly and welding steps are required to build a memory card reader. These steps consist in particular of assembling parts on top of each other (base made of rigid plastic, a metal cover, and a printed circuit that surmounts the cover) then welding these assembled parts on a motherboard of the terminal. This welding operation of the memory card reader is necessarily carried out after the electronic components have themselves been welded onto the motherboard. Thus, the welding operation of the memory card reader is essentially manual.

This step of mounting and welding the body of the memory card reader is one of the many steps of mounting a memory card reader terminal carried out manually, contributing to a high manufacturing cost.

There is therefore a need to provide a solution which makes it possible to reduce the number of mounting operations carried out manually in order to reduce the time and cost of manufacturing these memory card reading terminals.

3. SUMMARY OF THE INVENTION

The present disclosure, in at least certain embodiments, resolves all or part of the drawbacks of the prior art. Thus, according to a first aspect, there is disclosed a memory card reader body of generally rectangular parallelepiped shape comprising a slot for inserting a memory card, said memory card reader body comprising an upper face consisting of a cover and a lower face consisting of a base in which is made a through orifice intended to receive a memory card connector, said memory card reader body is remarkable in that:
  said base is a metal part comprising first assembly means with said cover each arranged on at least two opposite sides of said base,
  said cover is a metal part comprising second assembly means with said base each arranged on at least two opposite sides of said cover, and in that
  the first assembly means are intended to fit together with the second assembly means to form two lateral walls of said memory card reader body, said lateral walls having a generally rectangular parallelepiped shape and extending substantially perpendicular to the lower face of said memory card reader body.

The assembly and fixing of such a memory card reader body on the motherboard are simplified and can be carried out in a limited number of automated steps, thus reducing the number of manual interventions. This is made possible on the one hand by the fact that the base is metallic and on the other hand by the geometry of the lateral walls of the body of the memory card reader.

Indeed, this combination of characteristics makes it possible to place the body of the memory card reader directly on a surface of a motherboard, for example, and to put the whole thing in the oven in order to solder the body of the memory card reader on the motherboard without manual intervention. The lateral walls of the body of the memory card reader having a generally parallelepiped shape, the body of the memory card reader rests on the rectangle surface of the motherboard via a lower flat surface of these lateral walls.

Thus, the motherboard no longer needs to comprise orifices in which were inserted the assembly tabs of the memory card reader bodies of the prior art with a view to their welding.

A memory card reader body according to this technique advantageously makes it possible to automatically mount, that is to say without manual intervention, the body of the memory card reader on the motherboard. It also frees up space on the motherboard for other components such as a keyboard. Indeed, the disappearance of the orifices intended to receive the assembly tabs on the motherboard helps to free up space which can be used to enlarge the keyboard, to place other components on the motherboard or to place already present but differently and more efficiently components on the motherboard.

The fact that the base is made of metal also contributes to saving space on the motherboard. Indeed, at equivalent rigidity, a metal base has walls thinner than a plastic base.

According to a particular implementation of the memory card reader body, once fitted together, the first and second assembly means are fixed to each other by welding.

Thus, the cover and the base are secured. Such a memory card reader body is then shock resistant.

According to a particular implementation of the memory card reader body, the metal constituting the cover is doped with carbon atoms.

This makes it possible to protect the memory card connector from certain electromagnetic disturbances, in particular linked to the use of certain mobile telephony frequency bands such as the frequency bands complying with the GMS standard.

The invention also relates to a system for reading memory cards comprising:
 a motherboard on a surface of which is fixed a memory card connector, and
 a memory card reader body according to claim 1 arranged on said surface of the motherboard so that the memory card connector takes place within the through orifice intended to receive the memory card connector of said memory card reader body,
 said system being remarkable in that the lateral walls of said memory card reader body are fixed on the surface of the motherboard by means of a supply of material disposed between a lower surface of said lateral walls of said memory card reader body and the surface of the motherboard.

The fixing is made by welding, brazing, gluing. The used material depends on the desired final fixing method and any safety functions associated with this way of fixing (in particular when the fixing must be conductive to carry a safety function, such as a short circuit).

The step of fixing the body of the memory card reader to the motherboard is carried out automatically by depositing material, such as an abrasive paste, on the lower surface of the lateral walls of the body of the memory card reader prior to placing the body of the memory card reader on the motherboard. Everything is then placed in the oven so that the body of the memory card reader is welded to the motherboard.

The invention also concerns a method for mounting a memory card reading system as described above, the method comprising:
 a step of fixing the memory card connector on a surface of the motherboard,
 a step of placing the memory card reader body on said surface of the motherboard so that the memory card connector takes place within the through orifice intended to receive the memory card connector of said memory card reader body,
 a step of fixing said lateral walls of said memory card reader body to the surface of the motherboard by means of a material filler placed between a lower surface of said lateral walls of said memory card reader body and the surface of the motherboard.

A final object of the invention finally concerns a memory card reading terminal comprising a memory card reading system according to the invention.

The various embodiments mentioned above can be combined with each other for the implementation of the invention.

4. FIGURES

Other characteristics and advantages of the invention will appear more clearly on reading the following description of a preferred embodiment, given by way of a simple illustrative and non-limiting example, and the appended drawings, among which:

Figure 7:
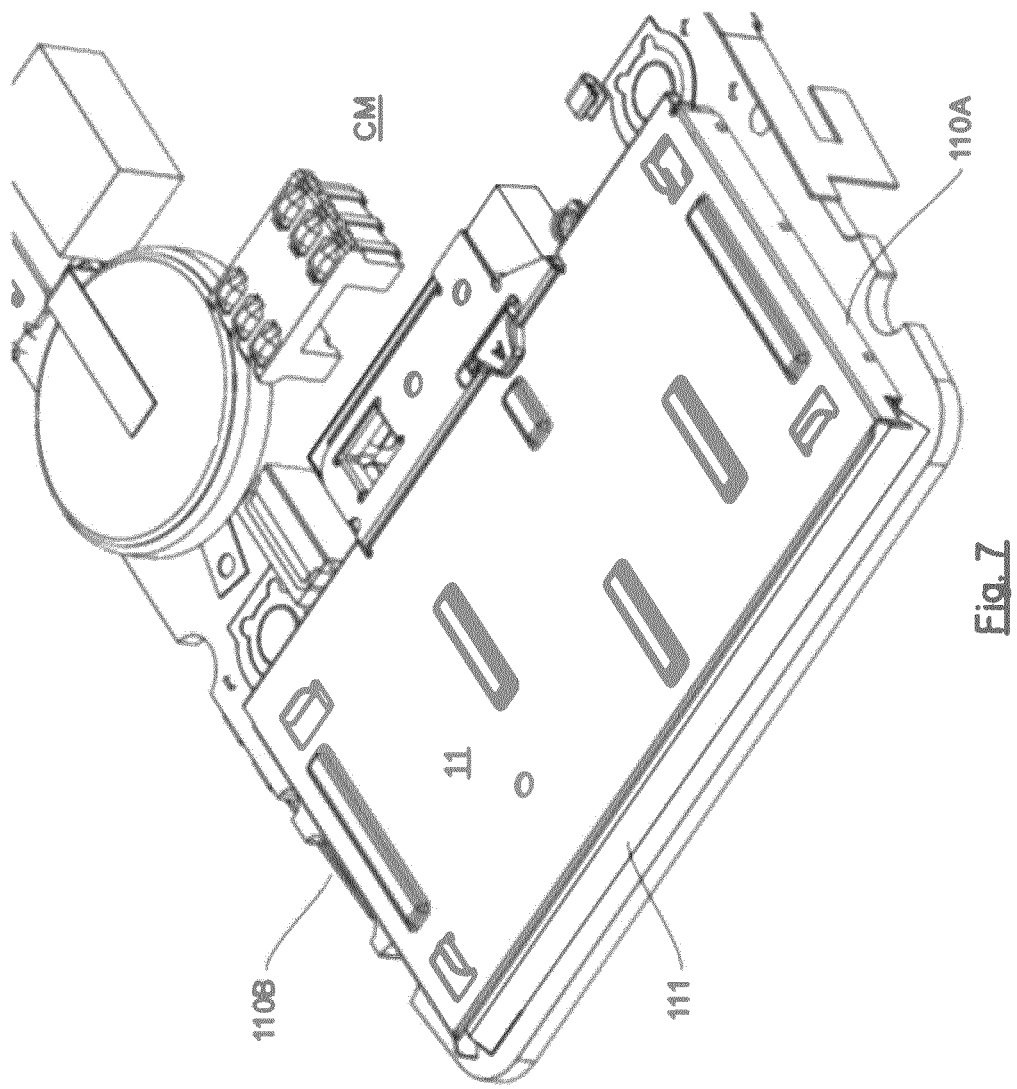
Figure 8:
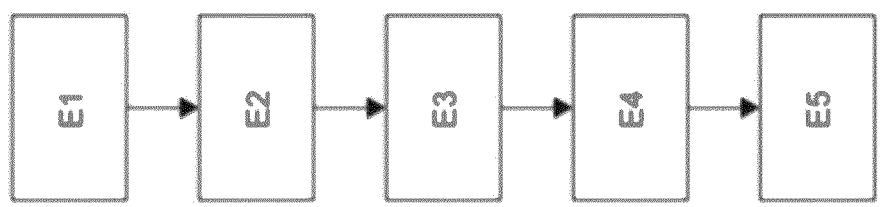
Figure 9:
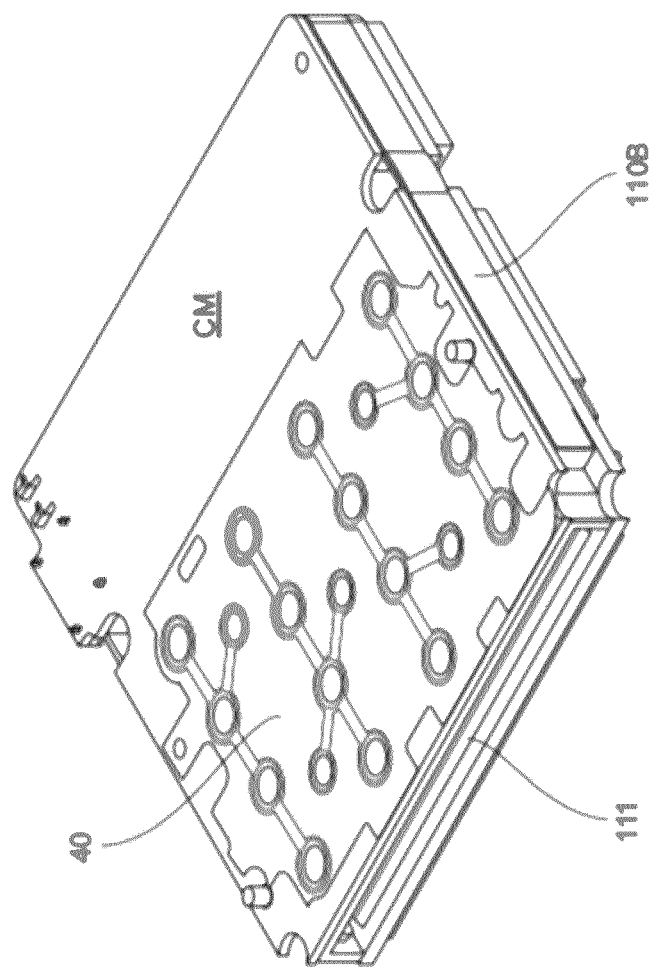

FIG. 7 represents an assembled memory card connector, according to an embodiment of the invention, once mounted on a motherboard, FIG. 8 represents the different steps of a mounting method, on a motherboard, of a memory card reader body according to an embodiment of the invention, FIG. 9 a keyboard arranged on a surface of the motherboard opposite to the surface on which is fixed the body of the memory card reader according to an embodiment of the invention.

5. DETAILED DESCRIPTION

The general principle of the invention consists in proposing a memory card reader body formed of two distinct main parts: a base and a cover, both made of metal and which, when they are fitted into one the other, form a memory card reader body having lateral walls of generally rectangular parallelepiped shape extending substantially perpendicularly to the lower face of said memory card reader body.

Figure 1:
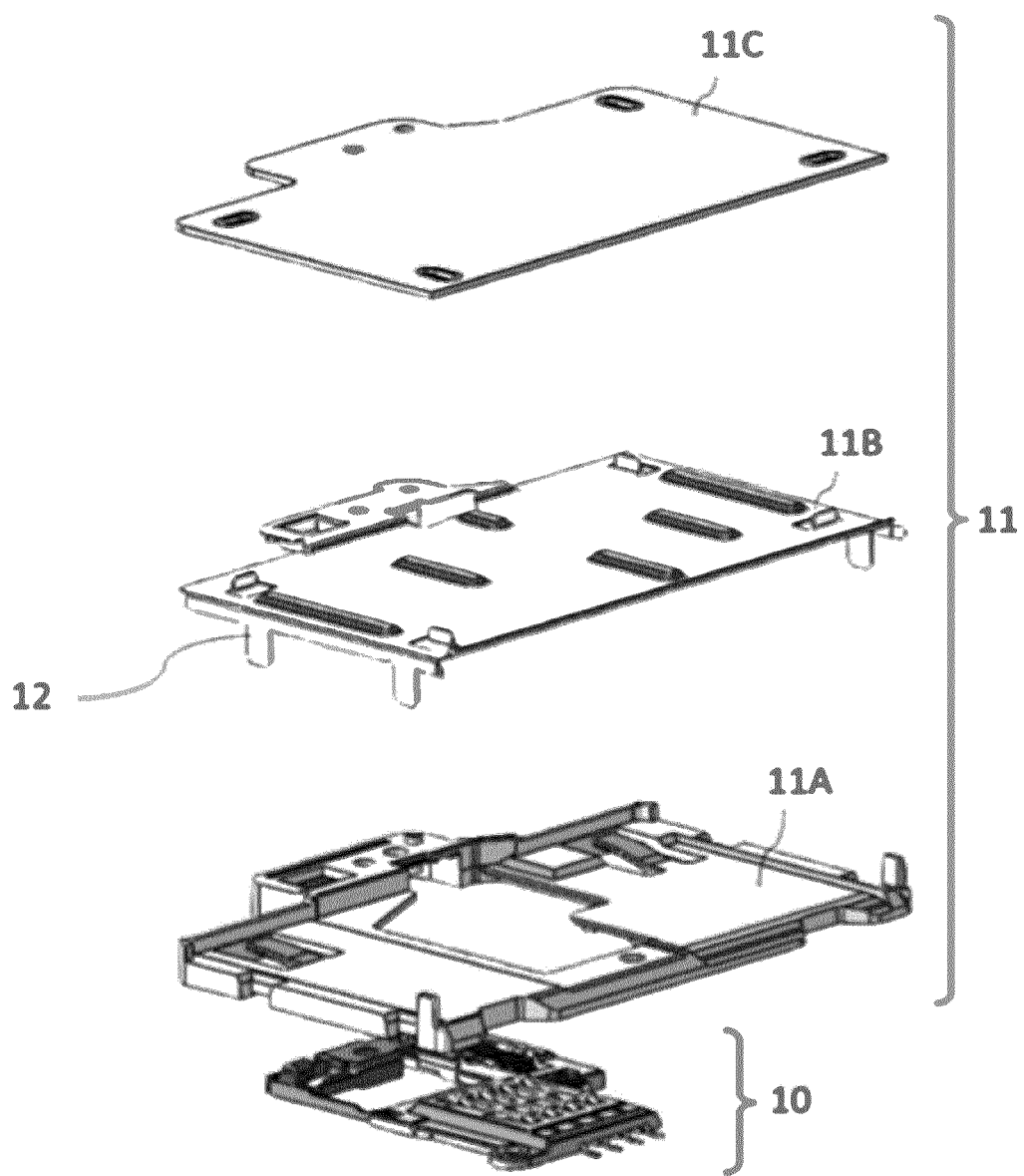
FIG. 1 illustrates the different constituents of a memory card connector according to the prior art.

It is described in relation to FIG. 1, a memory card connector 10 in relation to the prior art, which is independently constructed of a body of the memory card reader 11. The card connector memory 20 is intended to be connected to a main printed circuit (not shown), typically the motherboard of the memory card reading terminal in which it is installed, in order to ensure the functioning of the reader and its interconnection with the other components of the memory card reading terminal.

The body of the memory card reader 11 for example comprises three main parts: a base 11A made of rigid plastic, a metal cover 11B, and a printed circuit 11C which surmounts the cover 11B. The base 11A comprises a through orifice (a housing) intended to receive the memory card connector 10. This housing takes the form of an orifice passing through the base 11A right through, and in which the memory card connector 10 is housed when the base 11A is positioned on the motherboard. The cover 11B is then assembled on the base 11A, so as to form the slot for inserting a memory card into the memory card reader. Finally, the printed circuit 11C is fixed on the upper face of the cover 11B, so as to cover a major part of it, ideally all of it. Alternatively, the block formed by the cover 11B and the printed circuit 11C may have been preassembled, before the mounting phase of the memory card reader. In this case, it is the whole of this pre-assembled block which is positioned on the base 11A during the mounting of the reader.

The base 11A and the cover 11B both comprise assembly tabs 12 which make it possible to assemble the base 11A and the cover 11B to form the body of the memory card reader. These assembly tabs 12 are arranged on at least two opposite sides of the base 11A and the cover 11B.

The printed circuit 11C comprises at least one protection element, which is for example in the form of one or more intrusion detection lattices or in the form of one or more continuous intrusion detection tracks (for example a ground circuit, and two lattices at different potentials). This or these protection elements are positioned so as to cover a major part of the surface of the printed circuit 11C. Ideally, they are distributed over the entire surface of the printed circuit 11C, so as to provide increased security for the memory card reader.

Figure 2:
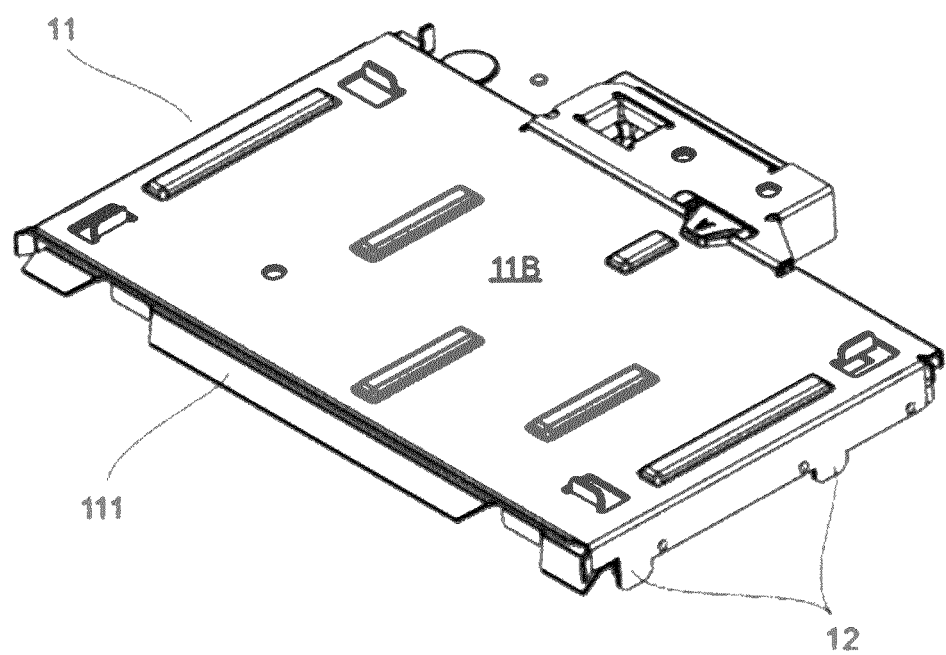
FIG. 2 shows such a prior art memory card connector once assembled.

Once assembled, and as shown in FIG. 2, the body of the memory card reader 11 is a generally parallelepipedal-rectangle shaped part, the base 11A and the cover 11B together forming an insertion slot 111 which makes it possible to insert a memory card in a correct position so that it comes into contact with the memory card connector 10, once in the stop position.

Figure 3:
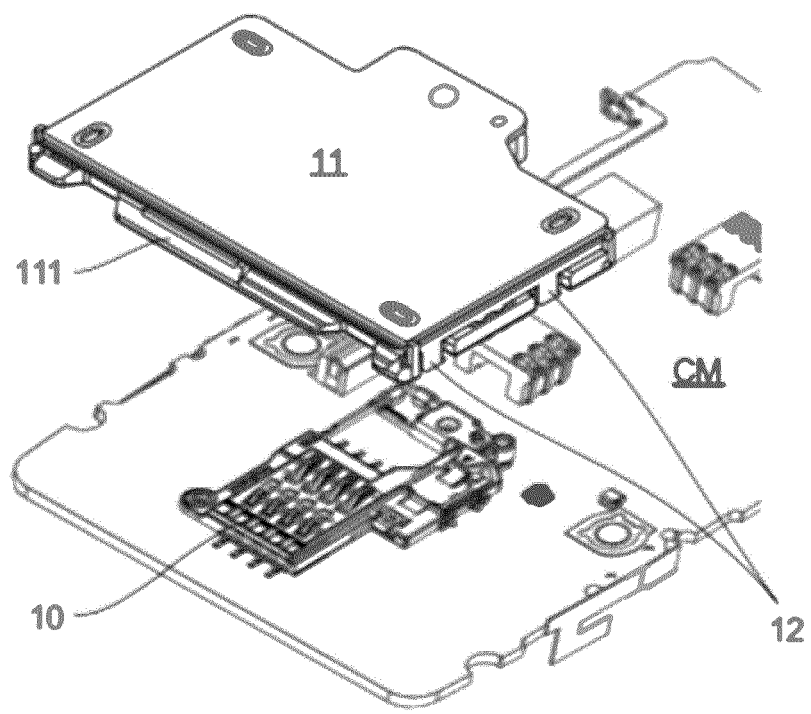
FIGS. 3 and 4 show a memory card connector of the prior art assembled respectively before it is mounted on a motherboard and once mounted on a motherboard.
Figure 4:
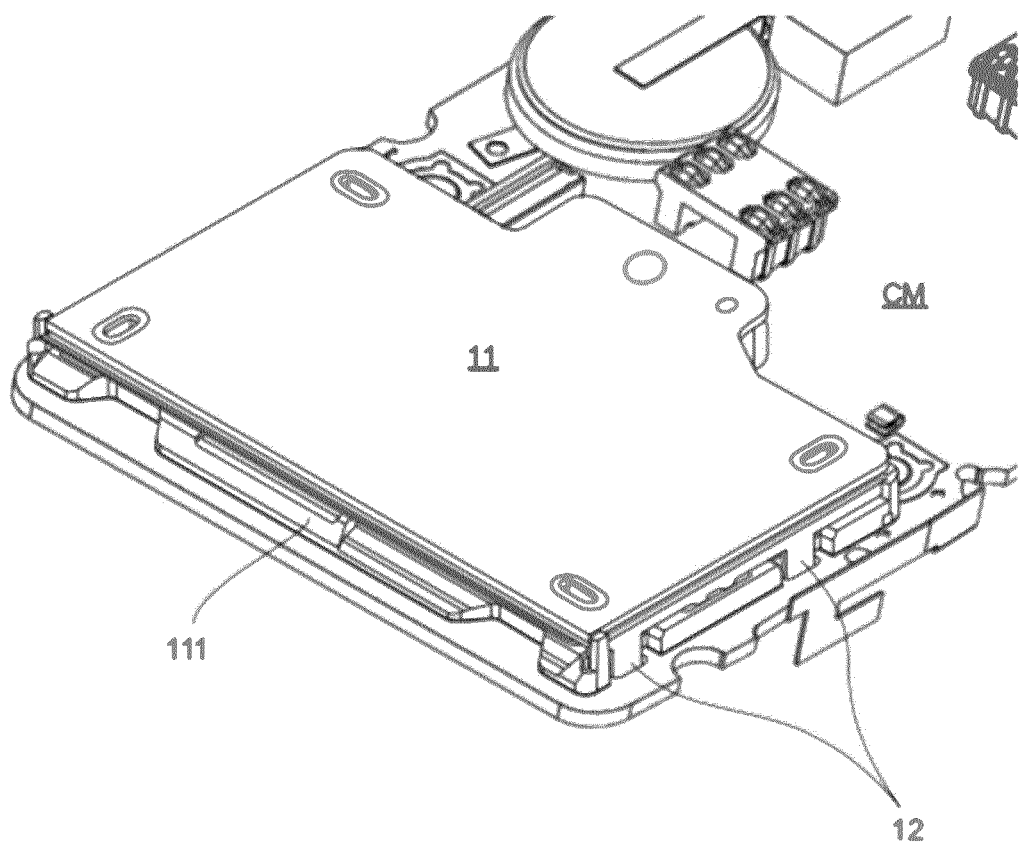

With reference to FIG. 3 and FIG. 4, when the body of the memory card reader 11 is assembled, the assembly tabs 12 of the cover 11B extend beyond the lower surface of the base 11A. The end of each of these assembly tabs 12 is intended to be introduced into a corresponding orifice 13 provided for this purpose on the motherboard CM in which they are welded. All of these explanations make it possible to take stock of the operations to be carried out to mount a memory card reader, one of the problems, as specified below, being to have to weld this memory card connector manually, after the electronic components have been welded (automatically).

Figure 5:
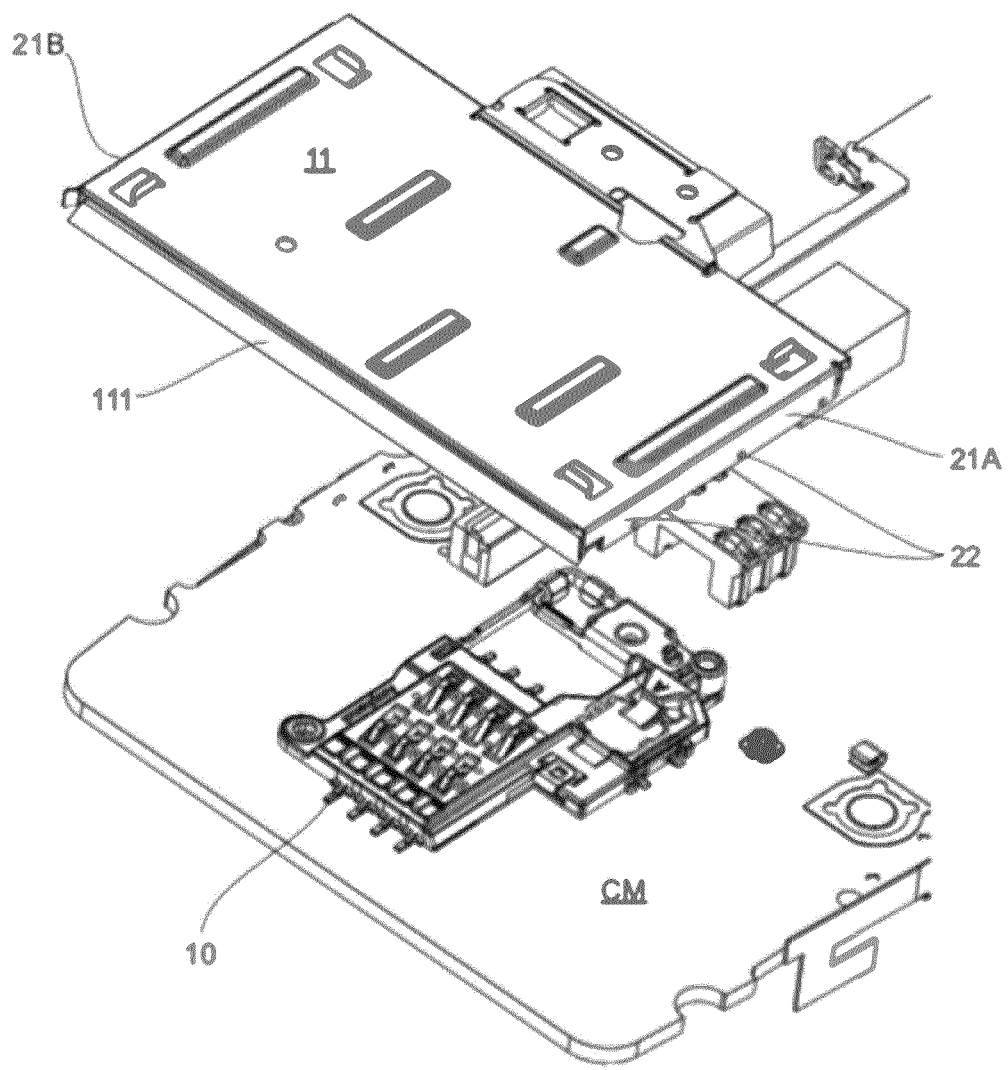
FIG. 5 represents an assembled memory card connector, according to an embodiment of the invention, before it is mounted on a motherboard.

Thus, the general principle of the invention is described in more detail in relation to FIG. 5. According to the proposed technique, a memory card connector 10 is constructed independently of a body of the memory card reader 11. The memory card connector 10 is designed in order to allow reading of the signals emanating from the memory card (not shown). To do this, the memory card connector 10 comprises a certain number of pins (eight in FIG. 5), making it possible to enter into contact with corresponding areas of the memory card chip (usually six or zo eight areas, depending on the type of memory card). These pins are generally metallic spring blades which are positioned on the surface of the chip. The memory card connector 10 is also intended to be connected to a main printed circuit, typically the motherboard CM of a memory card reading terminal in which it is installed, in order to ensure the operation of the memory card reader and its interconnection with the other components of the memory card reading terminal. In the rest of the document, this main printed circuit, on which the connector 10 is for example welded, is referred to as the «motherboard» CM. It should however be noted that the term «motherboard» should not be understood in a restrictive sense, and that in certain embodiments the main printed circuit is not necessarily the motherboard of the reading terminal. Since the subject of the disclosure is not the memory card connector, its detailed description will not be given further.

The memory card connector 10 is independent of the body of the memory card reader 11. In other words, the memory card connector 10 is not assembled with the body of the memory card reader 11 before being assembled on the motherboard CM of the memory card reading terminal: according to the proposed technique, the memory card connector 10 is fixed firstly on the motherboard CM, then the body of the memory card reader 11 assembled beforehand is placed over the connector 10 on the motherboard CM to be welded therein in the oven.

Advantageously, the assembly and fixing of the memory card reader on the motherboard CM are simplified and can be carried out in a limited number of automated steps. The implementation of a memory card reader body 11 whose base and cover are made of metals makes it possible to reduce the manufacturing costs of such a memory card reader while offering a significant space saving on the motherboard CM. Such a space saving on the motherboard can make it possible to increase the dimensions of a keyboard, for example.

As can be seen in FIG. 5, the memory card reader body 11 according to the proposed technique, is, for example, a piece of globally rectangular parallelepiped shape, with a width of about fifty-five millimeters, a depth of about thirty-two millimeters and a height of about four millimeters. Assembled, the base 11A and the cover 11B together form an insertion slot 111 which makes it possible to insert a memory card in a correct position so that it comes into contact with the memory card connector, once in the stop position. This insertion slot has a height comprised between 0.85 and 1.20 millimeters.

Thereafter, a specific embodiment of the invention is described, it being understood that this embodiment in no way limits the scope of the invention. More particularly, in other embodiments of the invention, the shapes of the base and the cover are not limited to those described below.

Figure 6:
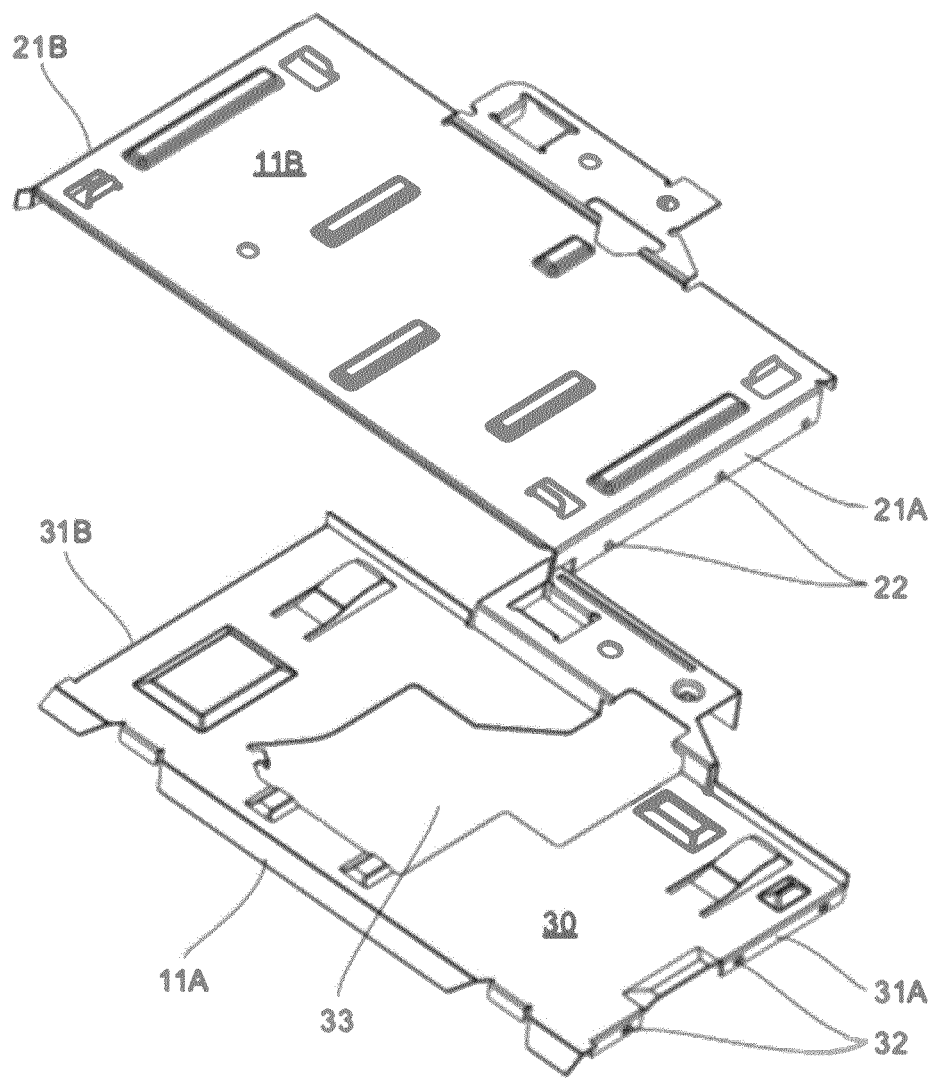
FIG. 6 represents the different components of a memory card connector according to an embodiment of the invention.

This embodiment is presented more particularly in relation to FIGS. 6 to 8. This embodiment comprises characteristics not previously described. On the other hand, identical reference numerals are used for the elements which have already been described in FIGS. 1-5.

With reference to FIG. 6, the body of the memory card reader 11 comprises two main parts: a base 11A, a cover 11B. In some implementations, a printed circuit (not shown in the figures) surmounts the cover 11B in order to protect the body of the memory card reader from possible intrusions.

The cover 11B has a generally rectangular parallelepiped shape, with a generally flat and rectangular main surface 20 and two lateral walls 21A, 21B of generally rectangular parallelepiped shape. The lateral walls 21A, 21B are substantially perpendicular to the main surface 20 of the cover 11B, and constitute assembly means with a base 11A described later.

The lateral walls 21A, 21B comprise fixing means 22, which can take the form of egg-ends allowing the cover 11B to be fixed on the base 11A as will be described later.

The base 11A of the body of the memory card reader 11 is presented in more detail in relation to FIG. 6 in a particular embodiment of the proposed technique. The base 11A is also of generally rectangular parallelepiped shape.

It also comprises a main surface 30 and two lateral walls (31A, 31B of generally rectangular parallelepiped shape. The lateral walls 31A, 31B are substantially perpendicular to the main surface 30 of the base 11A, and constitute assembly means with the cover 11B.

The lateral walls 31A, 31B comprise fixing means 32, which can take the form of egg-ends allowing the cover 11B to be fixed on the base 11A as will be described later.

The base 11A also comprises a housing 33 intended to receive the memory card connector 10 during the mounting of the body of the memory card reader 11 on the motherboard CM. This housing 33 takes the form of an orifice passing right through the base 11A. The shape of this receiving housing 33 is substantially complementary to the shape of the memory card connector 10. In a particular embodiment, the base 11A comprises centering pins (not shown), making it possible to ensure a correct centering of the base 11A on the connector 10 during the mounting.

In the presented embodiment, the base 11A of the body of the memory card reader 11 has the main function of guiding a memory card during its insertion into the memory card reader. Furthermore, in a clever way, in at least one variant, the base 11 comprises one or more of the following characteristics:

- it incorporates card brakes allowing to avoid shocks on the card stops; such card brakes consist, for example, of two flexible slats; each of these slats forms a predetermined angle with respect to the (flat) guiding surface of the memory card; depending on the embodiment, the angle of inclination of one slat may be different from the angle of inclination of the other slat;
- it is made of a dissipative material, which makes it possible to limit the effects of electrostatic discharges on a reading terminal; this electrostatic discharge characteristic can be combined with the previous characteristic: the slats, each with a different inclination, are able to slow down the card on the one hand and to discharge it of its static electricity on the other hand, in a progressive manner;
- it comprises a protective element on its lower face.

These additional characteristics cleverly stem from the implementation of a memory card reader 11 body which has an insertion slot obtained by assembling two interlocking parts (base 11A and cover 11B). Indeed, such characteristics cannot be implemented with a memory card reader 11 body in a single and unique part because the technicality of these characteristics prevents it.

The base 11A being metallic, its shape can then for example be obtained very simply from a simple metallic plate, by means of the usual techniques of cutting and embossing. The lateral walls 31A, 31B and the fixing means 32 can for example be obtained by simple bending and embossing of such a previously cut metal plate.

With reference to FIG. 5, previously described, and with reference to FIGS. 7 and 8, the main steps implemented to mount a memory card reader are now described, in a particular embodiment of the proposed technique.

In a first phase, the body of the memory card reader 11 is assembled in an automated manner by a robot.

Thus during a step E1 the cover 11B is assembled with the base 11A. The fixing means 22 arranged on the lateral walls 21A, 21B of the cover 11B have just fixed in the fixing means 32 arranged on the lateral walls 31A, 31B of the base 11A. The lateral walls 21A, 21B, 31A and 31B thus assembled constitute the lateral walls 110A, 110B of the body of the memory card reader 11 which have a globally rectangular parallelepiped shape and extend substantially perpendicular to the lower face of said memory card reader 11 body.

In an optional step E2, the cover 11B and the base 11A, once assembled during step E1, are welded at the fixing means 22 and 32.

At the same time, the card reader connector 10 is mounted on the motherboard CM.

During a step E3, a material, such as an abrasive paste, is applied to the lower surface of the lateral walls 110A, 110B of the body of the memory card reader 11.

Then, in a step F4, the body of the memory card reader 11 is placed on the surface of the motherboard CM so that the connector 10 is housed in the housing 33 provided in the base 11A of the body of the memory card reader 11 and so that the lower surface of the lateral walls 110A, 110B covered with the material is in contact with the surface of the motherboard CM.

Finally, in a step E5, everything is baked so that the material placed between the lower surface of the lateral walls 110A, 110B and the surface of the motherboard CM allows the welding of the body of the memory card reader 11 and the motherboard CM.

Thus, only a few simple and automated steps are required to assemble and fix the memory card reader body 11 on the motherboard CM.

FIG. 9 shows a keyboard 40 arranged on a surface of the motherboard CM opposite to the surface on which is fixed the body of the memory card reader. It can be seen in this figure that in the absence of the orifices 13 present on the motherboards of the prior art, it is possible to enlarge the keyboard 40. The characteristics presented in the described various embodiments can of course be individually combined or grouped with the general principle previously introduced, without departing from the scope of the present invention.

The invention claimed is:

1. A memory card reader body of globally rectangular parallelepiped shape comprising a slot for inserting a memory card, said memory card reader body comprising an upper face consisting of a cover and a lower face consisting of a base in which is made a through orifice intended to receive a memory card connector independent of said memory card reader body, said memory card reader body being wherein:
   said base is a metal part comprising first assembly means with said cover each arranged on at least two opposite sides of said base,
   said cover is a metal part comprising second assembly means with said base each arranged on at least two opposite sides of said cover, and in that
   the first assembly means are intended to fit together with the second assembly means to form two lateral walls of said memory card reader body, said lateral walls having a globally rectangular parallelepiped shape and extending substantially perpendicular to the lower face of said memory card reader body.

2. The memory card reader body according to claim 1, wherein once fitted together, the first and second assembly means are fixed to each other by welding.

3. The memory card reader body according to claim 1, wherein the metal constituting the cover is doped with carbon atoms.

4. A system for reading memory cards comprising:
- a motherboard on a surface of which is fixed a memory card connector, and
- a memory card reader body according to claim 1 disposed on said surface of the motherboard so that the memory card connector takes place within the through orifice intended to receive said memory card connector of said memory card reader body,
- said system being wherein the lateral walls of said memory card reader body are welded to the surface of the motherboard by means of a filler material disposed between a lower surface of said lateral walls of said memory card reader body and the surface of the motherboard.

5. A method for mounting a memory card reading system according to claim 4, method wherein it comprises:
- a step of fixing the memory card connector to a surface of the motherboard,
- a step of placing the memory card reader body on said surface of the motherboard so that the memory card connector takes place within the through orifice intended to receive said memory card connector of said memory card reader body,
- a step of fixing said lateral walls of said memory card reader body on the surface of the motherboard by means of a filler material disposed between a lower surface of said lateral walls of said memory card reader body and the surface of the motherboard.

6. A terminal for reading memory cards comprising a memory card reading system according to claim 4.

* * * * *